(12) United States Patent
Limbacher

(10) Patent No.: US 11,247,665 B2
(45) Date of Patent: Feb. 15, 2022

(54) METHOD FOR OPERATING A DRIVER ASSISTANCE SYSTEM OF A MOTOR VEHICLE AND MOTOR VEHICLE

(71) Applicant: AUDI AG, Ingolstadt (DE)

(72) Inventor: Reimund Limbacher, Ingolstadt (DE)

(73) Assignee: Audi AG, Ingolstadt (DE)

( * ) Notice: Subject to any disclaimer, the term of this patent is extended or adjusted under 35 U.S.C. 154(b) by 109 days.

(21) Appl. No.: 16/644,923

(22) PCT Filed: Aug. 22, 2018

(86) PCT No.: PCT/EP2018/072628
§ 371 (c)(1),
(2) Date: Mar. 5, 2020

(87) PCT Pub. No.: WO2019/048231
PCT Pub. Date: Mar. 14, 2019

(65) Prior Publication Data
US 2021/0070281 A1 Mar. 11, 2021

(30) Foreign Application Priority Data
Sep. 5, 2017 (DE) ..................... 10 2017 215 542.6

(51) Int. Cl.
*B60W 30/00* (2006.01)
*B60W 50/14* (2020.01)
(Continued)

(52) U.S. Cl.
CPC ............ *B60W 30/00* (2013.01); *B60W 50/14* (2013.01); *G01C 21/3453* (2013.01);
(Continued)

(58) Field of Classification Search
CPC ... B60W 30/00; B60W 50/14; G01C 21/3453; G01C 21/3626; G01C 21/3691; G08G 1/0967
See application file for complete search history.

(56) References Cited

U.S. PATENT DOCUMENTS 9,523,984 B1 * 12/2016 Herbach .............. G05D 1/0088
9,650,058 B2 5/2017 Schiek et al.
(Continued)

FOREIGN PATENT DOCUMENTS

DE 102009027613 A1 1/2011
DE 102013217552 A1 3/2015
(Continued)

OTHER PUBLICATIONS

International Search Report and Written Opinion directed to related International Patent Application No. PCT/EP2018/072628, with certified English-language translation of Written Opinion, dated Nov. 29, 2018; 15 pages.
(Continued)

*Primary Examiner* — Hussein Elchanti
(74) *Attorney, Agent, or Firm* — Sterne, Kessler, Goldstein & Fox P.L.L.C.

(57) ABSTRACT

A method for operating a driver assistance system, performing a driver assistance function of a motor vehicle. The driver assistance function is activable by the driver only if at least one activation criterion is satisfied and is automatically deactivated if at least one deactivation criterion is satisfied. If the driver assistance system is activable, then a piece of activability information indicating the activability is output to the driver and a projected activity time before the onset of a deactivation criterion is ascertained and is output together with the activability information. A reliability value for the activity time is determined at the projected activity time and
(Continued)

the output of the activability information and/or of the activity time is adjusted on the basis of the reliability value.

20 Claims, 3 Drawing Sheets

(51) Int. Cl.
 G01C 21/34 (2006.01)
 G01C 21/36 (2006.01)
 G08G 1/0967 (2006.01)
(52) U.S. Cl.
 CPC ..... *G01C 21/3626* (2013.01); *G01C 21/3691* (2013.01); *G08G 1/0967* (2013.01); *B60W 2050/146* (2013.01); *B60W 2555/60* (2020.02)

(56) References Cited

U.S. PATENT DOCUMENTS

| | | | |
|---|---|---|---|
| 9,772,626 B2 | 9/2017 | Bendewald et al. | |
| 9,884,631 B2 | 2/2018 | James et al. | |
| 9,947,052 B1* | 4/2018 | Slusar | G08G 1/0112 |
| 2013/0041548 A1 | 2/2013 | Krautter et al. | |
| 2015/0179062 A1* | 6/2015 | Ralston | G08G 1/0145 701/117 |
| 2016/0282874 A1* | 9/2016 | Kurata | G05D 1/0274 |
| 2017/0015319 A1 | 1/2017 | Knoller | |
| 2017/0028995 A1* | 2/2017 | Mori | B60Q 9/008 |
| 2017/0090480 A1* | 3/2017 | Ho | G05D 1/0214 |
| 2017/0120753 A1* | 5/2017 | Kentley | B60W 10/08 |
| 2017/0221279 A1* | 8/2017 | Yu | G06F 21/577 |
| 2017/0315550 A1* | 11/2017 | Ichikawa | B60W 60/0051 |
| 2018/0014182 A1* | 1/2018 | Jaegal | H04L 67/12 |
| 2018/0065549 A1* | 3/2018 | Watanabe | B60Q 5/005 |
| 2018/0088572 A1* | 3/2018 | Uchida | B60W 10/18 |
| 2018/0093676 A1* | 4/2018 | Emura | G05D 1/0061 |
| 2018/0237027 A1* | 8/2018 | Lundsgaard | G06Q 40/08 |
| 2018/0329415 A1* | 11/2018 | Aoi | B60W 30/182 |
| 2019/0004514 A1* | 1/2019 | Hiwatashi | G09G 3/001 |
| 2020/0047766 A1* | 2/2020 | Ko | B60W 10/10 |
| 2021/0070281 A1* | 3/2021 | Limbacher | B60W 30/17 |

FOREIGN PATENT DOCUMENTS

| | | |
|---|---|---|
| DE | 102014212596 A1 | 12/2015 |
| DE | 102014221132 A1 | 4/2016 |
| DE | 102015004469 A1 | 8/2016 |
| DE | 102016108812 A1 | 12/2016 |
| DE | 102015213181 B3 | 1/2017 |
| EP | 2531814 B1 | 2/2014 |
| EP | 2916190 A1 | 9/2015 |
| EP | 3231682 A1 | 10/2017 |
| WO | WO 2015049231 A1 | 4/2015 |

OTHER PUBLICATIONS

International Preliminary Report on Patentability directed to related International Patent Application No. PCT/EP2018/072628, dated Mar. 10, 2020, with attached English-language translation; 13 pages.

* cited by examiner

METHOD FOR OPERATING A DRIVER ASSISTANCE SYSTEM OF A MOTOR VEHICLE AND MOTOR VEHICLE

TECHNICAL FIELD

The disclosure relates to a method for operating a driver assistance system of a motor vehicle that realizes a driver assistance function, which driver assistance function is activable by the driver only if at least one activation criterion is satisfied, and is automatically deactivated if at least one deactivation criterion is satisfied. If the driver assistance system is activable then a piece of activability information indicating the activability is output to the driver and a projected activity time before the onset of a deactivation criterion is ascertained and is output together with the activability. The disclosure also relates to a motor vehicle equipped with the driver assistance system.

BACKGROUND

Various driver assistance systems are known which support the driver in the operation of a motor vehicle. In particular, driver assistance functions designed for at least partial, in particular complete, automatic vehicle guidance are to be mentioned that can be activated by the driver when the intended area of use exists for them. In order for an activation to be possible, at least one activation condition must be satisfied, with all activation conditions usually having to be satisfied in the case of a plurality of activation conditions. Since the driver assistance function is only intended for certain operating areas/operating states, there is usually also at least one deactivation criterion, which when satisfied leads to the driver assistance function being deactivated again, for which reason the satisfaction of a single deactivation criterion is usually sufficient in the case where there are a plurality of deactivation criteria and, where applicable, a driver takeover can be issued as a preliminary warning to the driver. An example of such a driver assistance system is a traffic jam assistance system in which the driver assistance function "traffic jam pilot" is available, which means an at least partially automatic guidance of the motor vehicle, in particular longitudinal guidance and/or lateral guidance at low speeds in a traffic jam.

In driver assistance systems of this type, which, unlike some other driver assistance systems, can be activated by a driver at virtually any point in time, there are sometimes a large number of activation obstacles which are not always manageable by a driver. In the case of a traffic jam assistance system having a traffic jam pilot function, reasons for preventing activation include, for example, that no vehicle in front was detected, no lane markings were detected, the vehicle in front is driving faster than 60 km/h, the wrong type of road is present (not a highway), pedestrians in the vicinity were detected, a toll station lies ahead and many more. In order not to have the driver attempt an activation "unnecessarily" too often, it was proposed to indicate to the driver that a state has been reached in which at least one activation condition is satisfied, and therefore there is no longer any reason for preventing activation. Activability information is therefore output, for example, within an instrument panel and/or a combination display and/or another display device, for example an availability indication of "traffic jam assistant available."

It is problematic here that due to the large number of different activation prevention reasons, which can change frequently and quickly along a route, for example (e.g. vehicle ahead, lane markings), the activation information may only be displayed very briefly and/or a just activated driver assistance function is deactivated again. This annoys the driver because he cannot reasonably expect the driver assistance system to be usable. For example, in the case of further developments of such driver assistance systems as a "highway pilot" and/or "city traffic jam pilot," this problem will be exacerbated after further activation prevention reasons have been added, for example that no hard shoulder has been detected, that there is no speed limit, that there is a traffic light/a crosswalk and the like.

In this context, WO 2015/049231 A1 discloses a method for a driver assistance system of a vehicle, which in particular realizes an autopilot function. It is proposed in this method to output a distance between a current position of the vehicle and the start of an autopilot route section, so that the driver is shown in a simple manner when the autopilot function will be available. A length of the autopilot route section can also be determined and output, for example in text form as a kilometer specification, in text form as a projected autopilot travel time, as a symbol or as a graphical representation of the planned route profile with the autopilot route section marked therein.

DETAILED DESCRIPTION

Figure 1:
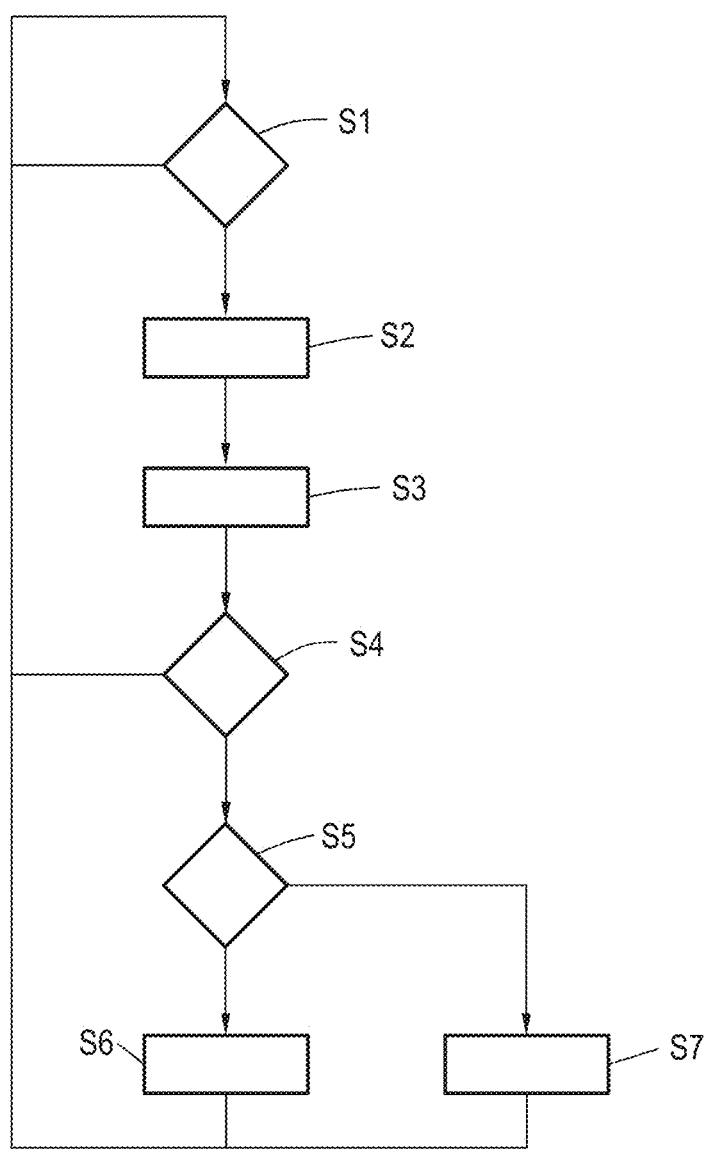
FIG. 1 is a flowchart of the method, in accordance with some embodiments of the disclosure.

The object of the disclosure is to further improve the driver's information with regard to driver assistance functions which can only be operated to a limited extent.

In order to achieve this object, one aspect of the present disclosure provides that a reliability value of the activity time is determined at the projected activity time and the output of the activability information and/or the activity time is adjusted on the basis of the reliability value.

According to the disclosure, it is proposed not only to enable the driver to estimate how long the driver assistance function can probably be operated, but also to associate reliability information which is dependent on a reliability value with this projected activity time, so that the usefulness of the projected activity time (which, incidentally, can also be displayed if the driver assistance function is already activated) significantly increases. Such a reliability value can also be referred to as a reliability measure. The driver is therefore provided with a broader basis for making a decision as to whether he actually wants to activate the driver assistance function when available, also taking into account any uncertainties that may exist, which may be based, for example, on the existence of a very animated motor vehicle environment, which makes the sudden onset of a deactivation condition appear more likely, while the determination of the projected activity time is preferably based on stationary environmental features that can be called up, for example, from digital map material and lead to the satisfaction of a deactivation condition, for example the end of a traffic jam and/or of a road type for which the driver assistance function is designed.

As a result, the driver can assess better overall whether it is worthwhile for him to switch on the piloted driving function in the current driving situation. For this purpose, the deactivability information is supplemented by additional information which shows how long the driver assistance function is likely to be available at this moment when it is activated and with what reliability value this projected activity time was determined.

A driver assistance system designed for at least partially automatic guidance of the motor vehicle is preferably used as the driver assistance system, in particular a traffic jam assistance system with a traffic jam pilot as driver assistance function.

In some embodiments, the projected activity time is only displayed when a first threshold value for the projected activity time is undershot. In some embodiments, the activability information is only displayed when a selected second threshold value less than the first threshold value is exceeded. This describes two extensions that can be realized both simultaneously and as an alternative. On the one hand, it is proposed not to display all the activability information until a certain minimum activity time, for example as a second threshold value in the range from 1 to 3 minutes, preferably 2 minutes, is available. This ensures that fewer unnecessary short availabilities are displayed, which quiets the display and ensures that the driver can also drive a worthwhile period of time with the driver assistance function. It should be noted, however, that the overall availability time of the driver assistance function is reduced in such a configuration. It can also be advantageous if the projected activity time is only displayed if it falls below a first threshold value which, if a second threshold value is provided, is to be selected to be greater than this second threshold value. This is based on the knowledge that the reliability value, i.e. the reliability measure, will be relatively low when projected activity times are high, which is why the display then appears to be less reliable. It is therefore proposed that, in the case of high values for the projected activity time, a projected activity distance is initially indicated, for example, in "km" and switched to the display of the projected activity driving time only starting at a specific, reliable, projected activity time. In other words, if the first threshold value is not undershot, a projected activity distance is displayed instead of the activity time.

In some embodiments, the first and/or the second threshold value can be selected on the basis of the reliability value. If, for example, it is determined that even longer projected activation times can be ascertained with a high reliability value, the first threshold value can be set accordingly in order to remain when the projected activation time is output, even for longer projected activation times. With regard to the second threshold value, for example if the reliability values are low, a longer projected activation time can also result in the driver assistance function being deactivated again very quickly, so that the output of the activability information can be suppressed further for safety reasons, and the second threshold value can therefore be increased.

In some embodiments of the present disclosure, a coloring, and/or an adjustment of the display size of the displayed projected activity time, of the activability information, of a further output element used in the output, a display of a further output element, or a combination thereof, is provided on the basis of the reliability information. There are therefore a large number of further concrete possibilities for modifying the information output on the basis of the reliability value in order to convey the reliability information obtained in the reliability value to a driver. For example, the reliability value can have an impact on the font size, so that, if the font size in which the projected activity time is displayed is smaller, it can be assumed that the font size will be less reliable. However, preference is given to coloring information that is output, for example a green color expressing high reliability, a yellow, white and/or red color representing lower reliability, and hence lower reliability values. It is also possible to display additional elements, for example, depending on the reliability value, to display the projected activity time with or without a frame. Symbol sizes can also be adjusted on the basis of the reliability value.

In some embodiments of the present disclosure, when a reliability value falls below a limit value, instead of a projected activity time, limits of an activity time interval extending around the projected activity time are displayed, the limits being determined in particular on the basis of the reliability value. In particular, if the reliability value specifies expected values for fluctuations, it is suitable for directly ascertaining the limits of such an activity time interval. Instead of specifying the ascertained projected activity time, the activity time interval covered by the "error bars" is displayed in an analogy, so that, for example, "2 to 4 minutes" can be output instead of "3 minutes."

The reliability value can be ascertained on the basis of the input data for ascertaining the projected activity time, in particular by means of error calculation for the ascertainment path of the projected activity time. This corresponds to a fundamentally known, customary ascertainment of a reliability measure, such quality values usually being available, for example, as measurement accuracies in sensors and/or in databases associated with the corresponding contents, which also applies to digital map material, for example, of a navigation system of the motor vehicle.

However, it is particularly preferred if the reliability value, in particular additionally, is determined on the basis of environmental data recorded by environmental sensors of the motor vehicle and/or operating data related to operating actions by the driver and/or weather data. Such additional data can be used, for example, to ascertain probability values for the satisfaction of non-location-related deactivation criteria. If the driver assistance system is concerned, for example, with the partially or completely automatic guidance of the motor vehicle, fog can indicate poor quality of environmental data from the environmental sensors, so that, where applicable, a limit of the driver assistance function is reached there. The same applies, for example, to roads that are too slippery. The presence of a large number of other motor vehicles and their traffic behavior, as can also be described by environmental data, provides information, for example, on how dynamically the current driving situation can change. Finally, operating information of the driver is also useful, for example set desired speeds, turn signal operations and the like. Information derived from the environmental data and/or other additional data, for example, a lane currently being used, whether there are lane markings, etc., may also be useful.

With regard to the ascertainment of the projected activity time, the position of stationary feature data describing at least one of the environmental features leading to the satisfaction of at least one deactivation criterion, route data describing the further route of the motor vehicle, traffic flow data describing the flow of traffic, in particular along the further route, environmental data recorded by sensors of the motor vehicle, or a combination thereof, are used as input data. In a specific, preferred embodiment, a remaining distance to travel to a closest one of the environmental features and to this end, a projected speed profile is first ascertained, from which the projected activity time is ascertained as the driving time with the projected speed profile along the remaining distance to travel. With regard to the ascertainment of the projected speed profile, speed data and/or traffic flow data assigned to the route sections of the remaining distance to travel are used in a digital map. In one exemplary embodiment, the location-related information from a digital map or predictive route data (intersections, traffic lights, branches and the like) can first be used to ascertain the next location-related environmental feature in which a deactivation condition would be satisfied. The remaining distance to travel can be determined at this location. The projected speed profile is then determined along the remaining distance to travel, for which purpose information from a digital map can again be used, for example speed limits entered there, typical average speeds and the like. In addition, current traffic flow data can flow in at this point and can also be received wirelessly, for example, from a server device or from the Internet. The remaining distance to travel and the potential speed profile then yield a remaining travel time.

In addition to the method, the disclosure also relates to a motor vehicle comprising a driver assistance system having a control device designed to carry out the method according to the disclosure. All statements relating to the method according to the disclosure can be analogously transferred to the motor vehicle according to the disclosure, with which, therefore, the already mentioned advantages can also be obtained. In particular, the motor vehicle has at least one display device via which the activity information and/or the projected activity time can be output.

Further advantages and details of the present disclosure will become apparent from the exemplary embodiments described below and with reference to the drawings.

FIG. 1 shows a flowchart of an exemplary embodiment of the method according to the disclosure for the operation of a driver assistance system, in this case a traffic jam assistance system whose driver assistance function ("traffic jam pilot") may only be activated by the driver when a plurality of activation conditions are satisfied and may only be deactivated again when at least one of a plurality of deactivation conditions is satisfied as a driver takeover request is output. A display device is assigned to the driver assistance system, in particular adjacent to or integrated with a control element for activating the driver assistance function.

In a step S1 of the method, a check is made of whether all activation conditions have been satisfied, that is, whether an activation of the driver assistance function by the driver would at all be possible. If this is not the case, the activation conditions are checked cyclically until they are satisfied.

If the activation conditions are satisfied, step S2 is continued, in which step a projected activity time is determined in the event that the driver assistance function would be activated immediately. For this purpose, environmental features in the current environment of the motor vehicle, which would lead to a satisfaction of a deactivation condition for the driver assistance function, are first ascertained from digital map material of a navigation system of the motor vehicle or predictive route data. The environmental features in the current environment of the motor vehicle can also be obtained in other ways, for example from environmental data of the motor vehicle obtained with environmental sensors and/or a communication device. The next such environmental feature along the route of the motor vehicle is determined and the remaining distance to travel up to this environmental feature is ascertained, which can occur off-loaded into the navigation system, as appropriate, or can be removed from it, if the navigation system is currently being used for route guidance. The projected speed profile is then determined along this remaining distance to travel, for which purpose data from the digital map or predictive route, data relating to the speed, that is, speed data, for example an average speed and/or speed limits assigned to route sections, are used. Current traffic flow data, which can be ascertained, for example, via the communication device of the motor vehicle, are also included in the projected speed profile. The remaining distance to travel and the speed profile then yield a remaining travel time, which is used as the projected activity time of the driver assistance function.

In a step S3, a reliability value, that is a reliability measure, is determined at the projected activity time. Existing quality values of the input data for ascertaining the projected activity time are used here just like additional data, including environmental data determined by environmental sensors and the communication device, operating data describing operating signals of the driver and weather data along the route. The additional data are used to indicate the probability of satisfying non-location-related deactivation criteria, which probability values are then likewise included in the reliability value.

In a step S4, there is then a check of whether the projected activity time falls below a second threshold value which is based on the reliability value. If the projected activity times are too short, activation of the driver assistance function can be regarded as unprofitable, so that step S1 is then continued again without activability information indicating the activability of the driver assistance function being output. The second threshold value can be in the range of extremely short times, for example less than one minute or even less than 30 seconds.

In a step S5, there is a check of whether the projected activity time is less than a first threshold value, which is also selected on the basis of the reliability value, but higher than the second threshold value. This second threshold value is in particular in the single-digit minute range and is based on the fact that the reliability value often becomes extremely small for longer projected activity times, so that a display of a projected activity distance then appears more expedient.

If the projected activity time is less than the first threshold value (and greater than the second threshold value), in a step S6, using the display device, the activability information indicating the activability of the driver assistance function and the projected activity time is output, this output being modified on the basis of the reliability value, as will be explained in more detail below with reference to FIGS. 2 to 4. If the first threshold value is exceeded in step S5, a branch is made at step S7, in which, instead of the projected activity time, a projected activity distance, in particular as the length of the remaining distance to travel, is output. Then in both cases the process returns to step S1.

Figure 2:
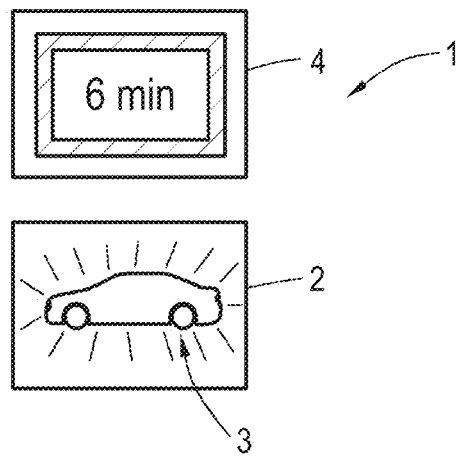
FIG. 2 is a possible first representation with reliable projected activity time, in accordance with some embodiments of the disclosure.

FIG. 2 shows a possible output on a display device 1, which in the present case comprises a control element 2 with a backlit symbol 3 for driver activation of the driver assistance function and a display 4 which is positioned adjacent to the operating element 2. Of course, other configurations are also possible, for example the use of a common touch display, the use of a display separate from the control element and the like.

FIG. 2 shows display information in which the driver assistance function is activable, which is why the symbol 3, as indicated, is backlit in green. A projected activity time of 6 minutes was determined, a high reliability value being present. The projected activity time is therefore shown in green, surrounded by a thick green frame and in a large font size on the display 4.

Figure 3:
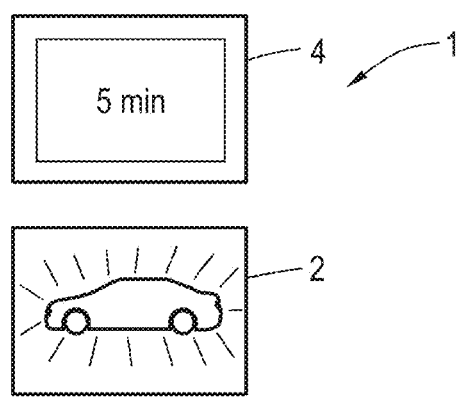
FIG. 3 is a possible second representation with less reliable projected activity time, in accordance with some embodiments of the disclosure.

FIG. 3 shows a situation in which there is again activability, but the projected activity time of 5 minutes was ascertained with a significantly lower reliability value. Accordingly, the display is no longer in green, but in yellow, the frame is significantly thinner and the font size is also significantly reduced. The driver thus becomes aware that the information on the display 4 is less reliable.

As an alternative to this, it is also possible to display an activity time interval with limits derived from the reliability value instead of the projected activity time with a low reliability value, in the above example, for example, "4 to 6 minutes" instead of "5 minutes."

Figure 4:
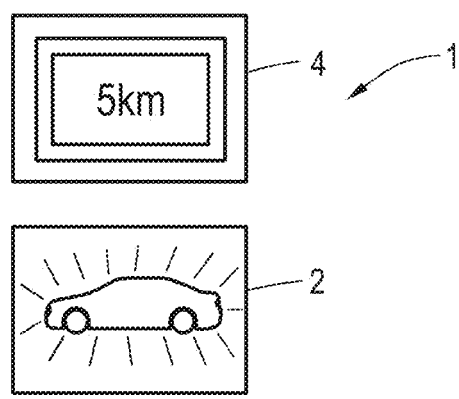
FIG. 4 is a possible representation with the display of an activity distance, in accordance with some embodiments of the disclosure.

FIG. 4 ultimately shows a case in which the first threshold value is exceeded in step S5, so that instead of the projected activity time, the projected activity distance, in this case 5 kilometers, is shown, all of this in the present case with a neutral frame in white.

In a case in which the activation conditions are not satisfied, the display 4 can be deactivated and the symbol 3 is not backlit.

Figure 5:
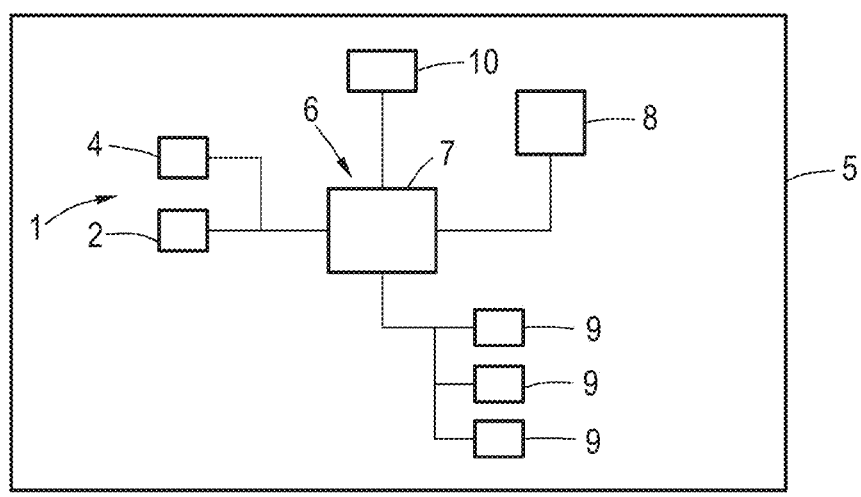
FIG. 5 is a schematic diagram of a motor vehicle, according to the disclosure, in accordance with some embodiments of the disclosure.

FIG. 5 ultimately shows a schematic diagram of a motor vehicle 5 according to the disclosure which has the driver assistance system 6 with an associated control unit 7. The control unit 7 is designed to carry out the method according to the disclosure and is correspondingly connected to the display device 4. The control unit 7 receives further data, for example, from a navigation system 8, environmental sensors 9 and a communication device 10 of the motor vehicle 5.

The invention claimed is:

1. A method for operating a driver assistance system of a motor vehicle, comprising:
   activating a driver assistance function by a driver based on at least one activation criterion for automatic guidance of the motor vehicle, wherein the activating comprises:
      ascertaining a projected activity time before an onset of a deactivation criterion, the projected activity time being a projected autopilot travel time;
      determining a reliability value of the projected activity time;
      outputting the projected activity time and a piece of activability information indicating an activability of the driver assistance function to the driver;
      adjusting the output of the piece of activability information or the projected activity time based on the reliability value; and
      switching on the driver assistance function to automatically guide the motor vehicle; and
   automatically deactivating the driver assistance function based on the deactivation criterion.

2. The method according to claim 1, further comprising:
   displaying the projected activity time if the projected activity time is less than a first threshold value; and
   displaying the piece of activability information if the projected activity time is more than a second threshold value, wherein the second threshold value is less than the first threshold value.

3. The method according to claim 2, further comprising: selecting the first and/or the second threshold value based on the reliability value.

4. The method according to claim 2, further comprising: displaying a projected activity distance if the projected activity time is not less than the first threshold value.

5. The method according to claim 1, further comprising: displaying by color, the projected activity time, and/or the piece of activability information.

6. The method according to claim 1, further comprising: displaying, with an adjustable size, of the projected activity time, and/or the piece of activability information.

7. The method according to claim 1, further comprising: based on the reliability value, displaying a further output element.

8. The method according to claim 1, further comprising:
   determining limits of an activity time interval extending around the projected activity time based on of the reliability value; and
   displaying the limits of the activity time interval if the reliability value falls below a limit value.

9. The method according to claim 1, wherein the determining the reliability value of the projected activity time comprises determining based on environmental data recorded by environmental sensors of the motor vehicle, and/or operating data about operator actions, and/or weather data.

10. The method according to claim 1, wherein the ascertaining the projected activity time comprises using input data, the input data comprising:
    a position of stationary feature data describing at least one environmental feature leading to satisfaction of the deactivation criterion;
    route data describing a further route of the motor vehicle;
    traffic flow data describing a flow of traffic along the further route; and
    environmental data recorded by sensors of the motor vehicle.

11. The method according to claim 10, wherein the determining the reliability value of the projected activity time comprises determining based on the input data by error calculation for an ascertainment path of the projected activity time.

12. The method according to claim 10, further comprising:
    ascertaining a remaining distance to travel to a nearest environmental feature and a projected speed profile related to the remaining distance to travel; and
    ascertaining the projected activity time as a driving time with the projected speed profile along the remaining distance to travel.

13. A motor vehicle, comprising:
    a driver assistance system, comprising:
       a control device configured to:
          activate a driver assistance function by a driver based on at least one activation criterion for automatic guidance of the motor vehicle, wherein the control device is further configured to:
             ascertain a projected activity time before an onset of a deactivation criterion, the projected activity time being a projected autopilot travel time;
             determine a reliability value of the projected activity time;
             output the projected activity time and a piece of activability information indicating an activability of the driver assistance function to the driver;
             adjust the output of the piece of activability information or the projected activity time based on the reliability value; and switch on the driver assistance function to automatically guide the motor vehicle; and
automatically deactivate the driver assistance function based on the deactivation criterion.

14. The motor vehicle of claim 13, further comprising:
a display device configured to:
   display the projected activity time if the projected activity time is less than a first threshold value; and
   display the piece of activability information if the projected activity time is more than a second threshold value, wherein the second threshold value is less than the first threshold value.

15. The motor vehicle of claim 14, wherein the control device is further configured to select the first threshold value and/or the second threshold value based on the reliability value.

16. The motor vehicle of claim 14, wherein the display device is further configured to display a projected activity distance if the projected activity time is not less than the first threshold value.

17. The motor vehicle of claim 14, wherein the display device is further configured to color the projected activity time and/or the piece of activability information.

18. The motor vehicle of claim 14, wherein the display device is further configured to adjust a display size of the projected activity time and/or the piece of activability information.

19. The motor vehicle of claim 14, wherein the display device is further configured to display a further output element based on the reliability value.

20. The motor vehicle of claim 13, wherein the driver assistance system is further configured to:
   determine limits of an activity time interval extending around the projected activity time based on the reliability value; and
   display the limits of the activity time interval if the reliability value falls below a limit value.

* * * * *